United States Patent
Cardinal et al.

(10) Patent No.: US 6,757,664 B1
(45) Date of Patent: Jun. 29, 2004

(54) METHOD AND SYSTEM FOR VERIFICATION OF CHECKS AT A POINT OF SALE

(75) Inventors: Robert J. Cardinal, Maplewood, MN (US); Dennis J. Cummings, Eagan, MN (US); Leonard A. Norum, Minneapolis, MN (US); Donald D. Lehr, Minnetonka, MN (US); Lois A. Palmer, Eagan, MN (US); Vernon L. Landrum, deceased, late of St. Paul, MN (US), by Amanda K. Landrum, Margo Kicker, heiresses; by LeAndra Lane Landrum, Houston, TX (US); by Georgina L. Landrum, Eden Prairie, MN (US); by Jaeme Ilisha Gadley, Kane, PA (US)

(73) Assignee: Arbitrage Arbitrageur LLC, Maplewood, MN (US)

( * ) Notice: Subject to any disclaimer, the term of this patent is extended or adjusted under 35 U.S.C. 154(b) by 0 days.

(21) Appl. No.: 09/260,940

(22) Filed: Mar. 2, 1999

(51) Int. Cl.[7] ............................................. G06F 17/60
(52) U.S. Cl. ......................................... 705/38; 705/39
(58) Field of Search ............................ 705/16, 17, 38, 705/39, 40, 44; 235/380, 379, 375

(56) References Cited

U.S. PATENT DOCUMENTS

| | | |
|---|---|---|
| RE30,579 E | 4/1981 | Goldman et al. |
| RE30,580 E | 4/1981 | Goldman et al. |
| RE30,821 E | 12/1981 | Goldman |
| 5,175,682 A | 12/1992 | Higashiyama et al. ....... 364/408 |
| 5,345,090 A | 9/1994 | Hludinski ................... 250/566 |
| 5,484,988 A * | 1/1996 | Hills et al. .................. 235/379 |
| 5,679,938 A | 10/1997 | Templeton et al. |
| 5,679,940 A | 10/1997 | Templeton et al. |
| 5,703,344 A * | 12/1997 | Bezy et al. ................. 235/379 |
| 6,164,528 A * | 12/2000 | Hills et al. .................. 235/379 |

FOREIGN PATENT DOCUMENTS

WO          WO 97/36267          * 10/1997          ............. G07F/7/10

OTHER PUBLICATIONS

Phillips Publishing, Inc., NACHA Issues Proposal for National POS Mark, Mar. 25, 1991, Card News, vol. 6, No. 6.*

* cited by examiner

*Primary Examiner*—Richard Chilcot
*Assistant Examiner*—Elaine Gort
(74) *Attorney, Agent, or Firm*—Dorsey & Whitney LLP

(57) ABSTRACT

A method for providing information concerning the availability of funds to cover a check proffered at a point of sale. In one embodiment, the method comprises capturing at the point of sale check transaction information on a bank account from which the check is drawn and transmitting the information to a funds checking computer, receiving at the funds checking computer account information on the bank account from which the check is drawn, the account information having been provided by a bank holding the bank account, determining at the funds checking computer the availability of funds in the bank account to cover the check proffered at the point of sale, and providing to the point of sale a funds availability status message.

12 Claims, 8 Drawing Sheets

```
                                    ┌─ 350
351 ─┬─ CONSUMER SYSTEM ACCOUNT NUMBER
352 ─┼─ CHECK NUMBER
353 ─┼─ DATE
354 ─┼─ TIME
355 ─┴─ TYPE OF ACCOUNT
```

*Fig. 8*

```
                                    ─ 360
361 ─┬─ CONSUMER SYSTEM ACCOUNT NUMBER
362 ─┼─ CONSUMER BANK NUMBER
363 ─┼─ CONSUMER CHECKING ACCOUNT NUMBER
364 ─┼─ CHECK NUMBER
365 ─┼─ TRANSACTION AMOUNT
366 ─┼─ TERMINAL ID
367 ─┼─ OPERATOR ID
368 ─┼─ DATE
369 ─┼─ TIME
370 ─┴─ TYPE OF ACCOUNT
```

*Fig. 9*

METHOD AND SYSTEM FOR VERIFICATION OF CHECKS AT A POINT OF SALE

BACKGROUND OF THE INVENTION

1. Field of the Invention

This invention relates to computerized verification methods and systems. More particularly, this invention relates to computerized methods and systems for checking the availability of funds in a checking account at the point of sale. The methods and systems are implemented in computer hardware and software.

2. Background Information

For many years consumers have paid for goods or services at the point of sale in stores by writing personal checks. Merchants who accept these personal checks typically assume that the checks are valid, and thus the merchant bears the ultimate risk of loss for fraudulent checks and for checks for which insufficient funds are present in the checking account. Because a significant amount of time is typically required to process checks (e.g., on the order of several days) and the merchant bears the ultimate risk of loss, some merchants are unwilling to accept personal checks as payment for goods or services.

FIG. 1 illustrates the typical path of a personal check 10 from presentation to a merchant 12 to payment from the consumer's bank 20, which may also be referred to as the issuing bank or the payor bank. The Uniform Commercial Code, as well as various federal laws, typically govern the liability of the parties involved in the presentment, collection, and payment of checks 10. The consumer first proffers the check 10 to the merchant 12 at the point of sale as payment for goods or services. The merchant 12 will then provide the check 10 to the merchant's bank 14, which may also be referred to as the depository bank or collecting bank. The merchant's bank 14 typically makes a provisional settlement with the merchant 12 so that the check 10 is credited as a deposit to the merchant's account. The merchant's bank 14 has a set period of time (which may vary depending on circumstances such as the law or location of the banks involved in the transaction) in which it may take back the credit of a provisional settlement.

The merchant's bank 14 then presents the check 10 for payment to the consumer bank 20. This presentation of the check 10 to the consumer bank 20 may be done by direct presentment between the banks, or by collection and presentment using the Federal Reserve Banks 18. If the merchant's bank 14 presents the check 10 directly to the consumer bank 20 (this path is not illustrated in FIG. 1), the consumer bank 20 has a set period of time in which it must refuse to honor the check 10 and notify the merchant's bank 14. If the consumer bank 20 does not dishonor the check 10 within this period of time, payment on the check 10 is made final and the consumer bank 20 will be liable if the check 10 is a bad check.

If collection and presentment through the Federal Reserve Banks 18 is used, as is commonly done when banks are not located in the same geographical area, the path shown in FIG. 1 is followed. The merchant's bank 14 forwards the checks 10 to the automated clearing house 16 (ACH). The ACH 16 sorts the checks 10 by their issuing banks 20, electronically forwards information on the checks 10 to the Federal Reserve Bank 18, and forwards the checks 10 to the appropriate issuing banks 20. The Federal Reserve Bank 18, in turn, transmits the electronic information pertaining to the checks 10 to the consumer's bank 20. The Federal Reserve Bank 18, therefore, acts as an intermediary between the merchant's bank 14 and the consumer bank 20 to facilitate presentment and collection for checks 10.

After the consumer bank 20 receives the information on the check 10, it has a set period of time in which it must report that the check 10 has not cleared if insufficient funds are available in the consumer's account or if the consumer's account has been closed. If the consumer bank 20 does not issue such a report in due time, it bears the risk of loss on the check 10. If the consumer bank 20 reports that the check 10 has not cleared, the merchant's bank 14 will typically deduct from the merchant's account the amount of the check 10 (which had previously provisionally settled with the merchant 12 by posting a credit for the check 10 to the merchant's account when the merchant's bank 13 assumed that the check 10 was valid). Although the merchant's bank 14 is liable for the bad check if it does not notify the merchant 12 in due time, it is the merchant 12 that bears the ultimate risk of loss for bad checks 10.

There are numerous problems associated with the typical method of processing checks described above. The problems affect the consumer, the merchant 12, and the banks involved in the transaction. Consumers frequently pay the costs associated with bad checks. One report found that bad checks cost consumers around $5.6 billion each year. The FSA Facts, a service of the Financial Stationers Association, Issue 18, Jul. 23, 1998. Many consumers with accounts at consumer banks 20 assume incorrectly that they have sufficient funds to cover the amount of a check. If the consumer bank 20 covers the amount of the check in spite of sufficient funds, the consumer bank 20 will typically charge the consumer a service charge, frequently on the order of $20 to $25 per check. Such hefty payments may make it difficult for some consumers to afford bank accounts. Many banks are also not willing to open accounts for risky consumers, because the bank may bear the risk of loss on bad checks if it does not respond within set periods of time for bad checks.

The consumer bank 20 (or the issuing or payor bank) may also be harmed by bad checks. The consumer bank 20 may not pay a check unless it is properly payable, and a check is not properly payable if it has a forged drawer's signature or a forged endorsement. If the consumer bank 20 charges the consumer's account for a check that is not properly payable, it must typically recredit the consumer's account. On these checks, therefore, the consumer bank 20 carries a risk of loss if a check has an unauthorized signature. Because it may be difficult for consumer banks 20 to determine if certain checks have forged signatures, consumer banks 20 have no practical method of avoiding such problems aside from refusing to open accounts for risky consumers. Consumer banks 20 and merchant's banks 14 may both bear the risk of loss for bad checks if they do not act within set deadlines in reporting bad checks.

As noted above, merchants 12 are also harmed by bad checks. If consumer banks 20 and merchant's banks 14 act on bad checks within their deadlines, it is the merchant 12 that bears the ultimate risk of loss. Merchants 12, therefore, may be unwilling to accept personal checks from some or all consumers, and this may result in a loss of business for the merchant 12.

The amount of time typically involved in check presentment and collection can result in decreased efficiency and increased costs in processing checks. Extended amounts of time taken processing checks allows fraudulent check writers an extended amount of time during which they are free to write fraudulent checks before their checking account numbers are added to lists of bad or risky checking accounts. Time delays in processing checks may also affect banks, because banks may be liable if response times are not met in processing checks.

Electronic processing of checks may reduce some of the problems associated with the time delays in processing checks. Magnetic Ink Character Recognition (MICR) readers or optical readers may be used at the point of sale for reading magnetic account information printed on checks. This data may be fed directly into point of sale terminals, and other information, such as the amount for which the check is written may be entered in any convenient manner, such as through a keypad. All of the information for a given check may be combined into a data record which may then be electronically forwarded to the ACH so that presentment and collection of the check between the merchant's bank 13 and consumer bank 20 may be done electronically. Such a system and method is disclosed in U.S. Patent No. 5,175,682, issued to Higashiyama et al. on Dec. 29, 1992.

Prior art methods and systems, however, do not solve all of the problems discussed above. Although systems and methods may be available that decrease the time associated with check processing as described above, these systems and methods lack the ability to reliably notify the merchant and consumer of a bad check at the point of sale. A method and system is therefore needed that may be used to notify the merchant and consumer of bad checks at the point of sale.

SUMMARY OF THE INVENTION

One embodiment of the invention is a method for providing information concerning the availability of funds to cover a check proffered at a point of sale. In this embodiment, the method comprises capturing at the point of sale check transaction information on a bank account from which the check is drawn and transmitting the information to a funds checking computer, receiving at the funds checking computer account information on the bank account from which the check is drawn, the account information having been provided by a bank holding the bank account, determining at the funds checking computer the availability of funds in the bank account to cover the check proffered at the point of sale, and providing to the point of sale a funds availability status message.

Another embodiment of the invention is a method for checking the availability of funds for a check at a point of sale, wherein a consumer presents a proposed check payment written on the consumer's bank account at the point of sale. In this embodiment, the method comprises receiving from the consumer at the point of sale and storing in a consumer database at a remote location check transaction information for the consumer's proposed check payment, wherein the check transaction information includes a checking account number and an amount of the check, receiving from the consumer's bank and storing in the consumer database at the remote location account information for the consumer's bank account, wherein the account information includes a balance in the consumer's bank account, analyzing the account information and check transaction information in the consumer database to determine whether the consumer has adequate funds to cover the consumer's proposed check payment, and notifying a merchant as to whether the consumer has adequate funds to cover the consumer's proposed check payment.

Yet another embodiment of the invention is a system for verifying and processing a check written by a consumer on the consumer's bank account at a point of sale for a transaction. This embodiment of the invention comprises transaction equipment capable of acquiring and storing check transaction information at the point of sale for a consumer's proposed check payment, a network connected to the transaction equipment, and programs existing on a remote computer, wherein the programs include instructions for receiving and storing check transaction information and bank account information, instructions for analyzing the check transaction information and bank account information to determine if sufficient funds are present in a bank account from which the proposed check is drawn, and instructions for notifying a merchant as to whether the consumer has adequate funds to cover the consumer's proposed check payment.

The present invention provides numerous advantages. The embodiments described above may benefit consumers because it may prevent consumers from bouncing checks frequently, and the consumer may therefore avoid bounced check penalties and penalties for accidental overdrafts. The invention may also provide some protection to the consumer from lost or stolen checks. In addition, banks may be more willing to open bank accounts for low income consumers who may, without the use of the present invention, bounce checks or have insufficient funds frequently. The invention also decreases the chance that consumers or merchant's banks will be liable for bad checks, such as checks with forged endorsements. Finally, the invention may also protect merchants from fraudulent checks, stolen checks, and checks for which the corresponding account does not have sufficient funds.

These and other features and objectives of the present invention will become apparent with reference to the drawings, the description of the preferred embodiment, and the appended claims.

DESCRIPTION OF THE DRAWINGS

FIG. 8 shows the types of information that may be sent to the point of sale for a clear check message;

FIG. 9 shows the types of information that may be sent to the point of sale for an insufficient funds message;

DETAILED DESCRIPTION

The teachings of the present invention are applicable to many different types of computer networks and may also be used, for instance, in conjunction with direct on-line connections to databases. As will be appreciated by those of ordinary skill in the art, while the following discussion sets forth various preferred implementations of the methods and systems of the present invention, these implementations are not intended to be restrictive of the appended claims, nor are they intended to imply that the claimed invention has limited applicability to one type of computer or computer network. In this regard, the teachings of the present invention are equally applicable for use in Local Area Networks ("LANs") of all types, Wide Area Networks ("WANs"), private networks, and public networks including the Internet and the Web.

The accompanying Figures depict embodiments of the present invention, and features and components thereof. With regard to references in this specification to computers, the computers may be any standard computer including standard attachments and components thereof (e.g., a disk drive, hard drive, CD player or network server that communicates with a CPU and main memory, a sound board, a keyboard and mouse, and a monitor). The processor of the CPU in the computer may be any conventional general purpose single- or multi-chip microprocessor such as a Pentium® processor, a Pentium® Pro processor, a 8051 processor, a MIPS® processor, a Power PC® processor, or an ALPHA® processor. In addition, the processor may be any conventional special purpose processor such as a digital signal processor or a graphics processor. The microprocessor has conventional address lines, conventional data lines, and one or more conventional control lines. With regard to references to software, the software may be standard software used by those skilled in the art or may be coded in any standard programming language to accomplish the tasks detailed below.

a. General Overview of Equipment of the Invention

The methods and systems of the invention will be described in reference to the attached FIGS. 1–11. In one embodiment, the systems and methods of the present invention build upon the system and method for expediting the presentment and collection of checks that is disclosed in U.S. Patent No. 5,175,682, issued to Higashiyama et al. The systems and methods of the present invention may be used to notify the merchant and consumer at the point of sale as to whether sufficient funds are present for a given proffered check which the consumer presents to the merchant at the point of sale as part of a purchase transaction. The systems and methods may also notify the merchant if the checking account is not an open and valid account, and the systems and methods may also be used to verify that the check is being presented by the checking account's rightful owner.

1. Transaction Equipment

Figure 2:
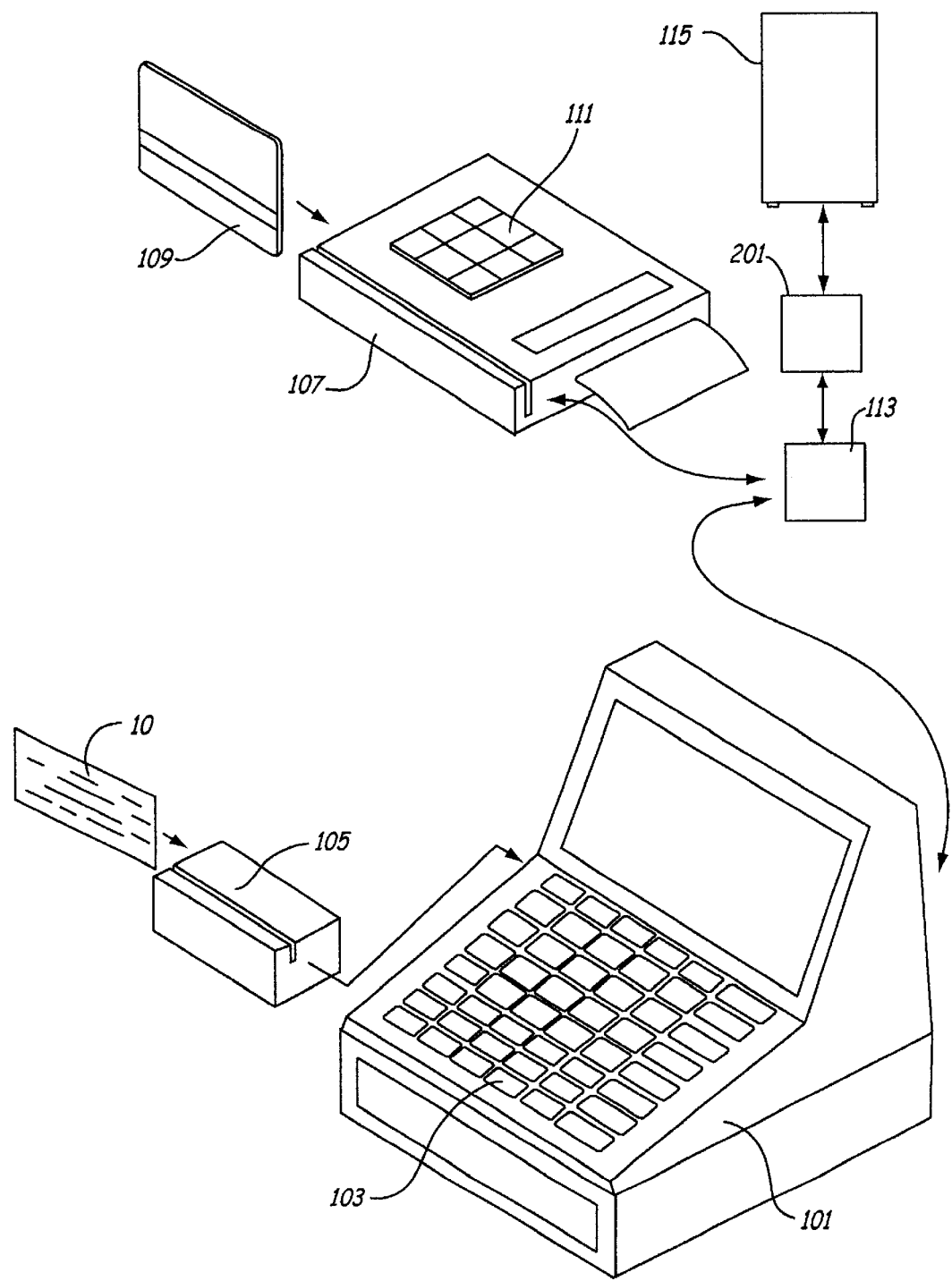
FIG. 2 is a block diagram overview of equipment elements that may be located at a point of sale and at a remote location to carry out the present invention.

FIG. 2 shows one embodiment of the equipment of the present invention, which, aside from computer 115, is located at the point of sale in a merchant store, such as at the check-out counter or the like. The equipment includes a variety of transaction equipment which may be used to gather information at the point of sale. Cash register 101 could be a prior art electronic cash register, such as one that is commonly found at the check-out line at a retail outlet, and may, in one embodiment, have many of the capabilities of a general purpose computer. Register 101 may operate in connection with a bar code reader (not shown) that may identify products being purchased by the consumer. The register 101 may have a keypad 103 through which the merchant clerk can enter prices of products, the amount of a check written by a consumer, and other information that may be used by the register 101. Such a register 101 may have the capability for providing operator prompts, performing data capture, data storage, receipt generation, and data transmission to a networked computer that is on-site or at a remote location. The register 101, therefore, may be capable of transmitting and receiving information from a remote computer, such as computer 115. Although not depicted in FIG. 2, a backroom processor or other on-site computer may be used for local storage of the information gathered with the transaction equipment at the point of sale.

A Magnetic Ink Character Recognition (MICR) reader 105, bar reader, optical reader or other automated reader may operate in conjunction with the register 101. When a consumer presents a check for payment to the merchant clerk, the clerk can run the check through the reader 105 so that information on the check may be read into the register 101. The term "check transaction information" will be used throughout this specification to refer to this information on the consumer's check, as well as any additional information about the consumer's check or transaction that may be entered through a reader 105 or through other methods, including typing information, such as the amount of a check, into a keypad 103. In one alternative embodiment, the clerk can enter all of the check transaction information manually through a keypad 103. Magnetic characters commonly encode information on the surface of the check. Such information includes the routing number of the consumer bank, the consumer's account number, and the check number. In another embodiment, handwritten information on the check, such as the amount for which the check is written, may be scanned into the register 101 with a more advanced scanner reader (not shown). The check transaction information may be permanently or temporarily stored in the register 101 or in the backroom processor.

Also shown in FIG. 2 is an identification terminal 107 that may be used to read an identification card 109. The identification card 109 may be any commonly used identification card, such as a government-issued identification card, with data encoded as a bar code or on a magnetic strip for automated reading. The identification card 109 may also be a privately-issued identification card, with data encoded as a bar code or on a magnetic strip, that may be issued to consumers who participate in the methods and systems of the invention. The identification terminal 111 may contain a keypad 111 through which the consumer may enter an identification number, such as a PIN number, that may be used in accordance with the present invention. The term "identification information" will be used throughout this specification to refer to any identification data, such as PIN numbers and corresponding system or program account numbers, for a given consumer.

The identification terminal 111 and the reader 105 may be programmable electronic devices with computing and data storage capabilities. In one embodiment of the present invention, the equipment shown in FIG. 1 may be integrated into fewer devices, or even into a single device. Also, some of the equipment may perform more than one function. For example, the reader 105 and the identification terminal 111 could be integrated into a single reader that is capable of reading both checks 10 and identification cards 109. The identification terminal 107 and the reader 105 may be connected to the register 101 directly or through any other method known to those skilled in the art.

2. Funds Checking Computer

A remote computer 115 may be connected to the register 101 through the communications device 113. The computer 115 may be any standard computer known to those skilled in the art, such as those described above. Although the computer 115 will be referred to throughout this specification as a single computer, it may be any number of computers networked together into a computer system or it may be one or more computer servers operating over the World Wide Web. One purpose of the computer 115 is to gather check transaction information from the point of sale and account information from the bank from which the consumer's check is drawn and to process this information to determine if funds are available in the bank account to cover the proffered check. The computer 115, therefore, may be referred to as a funds checking computer.

In one embodiment, the computer 115 is located in a remote location, and is accessed from the point of sale through a communications device 113. Communications device 113 may allow access to and from the computer through a wide area network, such as the public telephone network or an internet. Computer 115, therefore, may be capable of communicating with multiple registers 101 at a number of different locations at the same time. The communications device 113 in this embodiment may therefore include modems that communicate with the computer 115 and use proprietary or commercially available communications software to transmit information to or from the computer 115. Although FIG. 2 does not depict a large number of connections to the communications device 113, the communications device 113 may allow connection to a variety of other computers or computer networks, such as those of banks that maintain account information for consumers and merchants.

Figure 3:
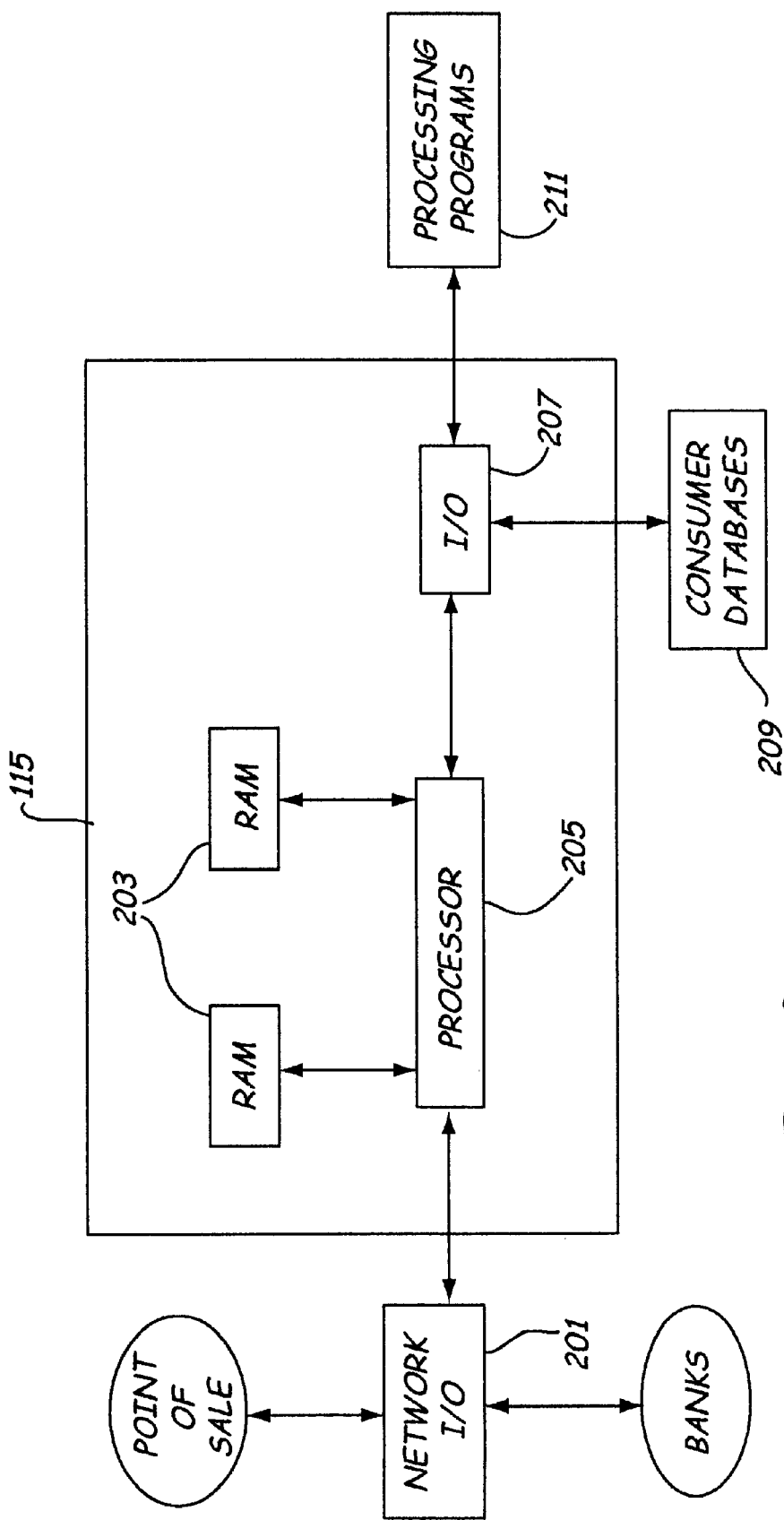
FIG. 3 is a block diagram the computer 115 of FIG. 2.

FIG. 3 illustrates in block diagram form the components of the computer 115. The network I/O circuitry 201 of the computer 115 should be capable of receiving information from the communications device 113. The composition of the network I/O circuitry 201 is dependent upon the type of wide area network used to transfer the information from the point of sale. The network I/O circuitry 201 could be, for example, a bank of modems that receive calls from remote communications devices, or an IP router that routes TCP/IP information. Many other configurations are possible, as would be apparent to one skilled in the art, and the present invention is not meant to be limited to any particular type of network. In one embodiment, for example, the computer 115 may be a server operating over the World Wide Web, and the register 101 or backroom processor at the point of sale may be capable of communicating over the internet with the server.

The computer 115 comprises local storage 203 and an I/O interface 207 for communicating with the various databases of the computer 115. The computer 115 also contains processor 205 to process the information in the consumer databases 209 using the processing programs 211 of the computer 115. The functions of the processing programs 211 and the content of the consumer databases 209 will be described more fully in the discussion that follows. As is well known in the art, the computer 115 executes programs 211 stored on a data storage medium to carry out the functions of the invention. In short, the processing programs 211 may include instructions for receiving and storing check transaction information gathered from the point of sale and bank account information gathered from banks, instructions for analyzing the check transaction information and bank account information to determine if sufficient funds are present in the consumer's bank account to cover a proffered check, and instructions for notifying a merchant as to whether the consumer has adequate funds to cover the consumer's proffered check payment.

The databases 209 may be contained on local storage such as a magnetic or optical disk drive, or can be remote databases that are accessed over a network of any variety known to those skilled in the art. Although FIG. 3 depicts one consumer database 209, any number of databases may be used within the scope of this invention. The depicted database structure, therefore, is not meant to limit the scope of the invention.

b. Structure of Information Records

The computer 115 may be capable of communicating with the register 101 through communications device 113 to receive check transaction information and identification information for consumer transactions. The computer 115 may also be capable of communicating with various banks to receive and transmit bank account information for various bank accounts. The computer 115 may communicate with various banks and with the register 101 over the network I/O 201 described above. The type of network I/O 201 may vary for different communications networks, such that any network communications devices and methods known to those skilled in the art may be used within the scope of the invention. The information in the following descriptions of the various records which may be transmitted or received by the computer 115 may be stored in the consumer databases 209 of the computer 115. The specific data or information depicted in FIGS. 4–9 as the content of various records or databases of the invention are for illustrative purposes only, and specific data depicted in the figures may be excluded from the records or specific data not listed may be included in the record without departing from the scope of the invention.

Figure 4:
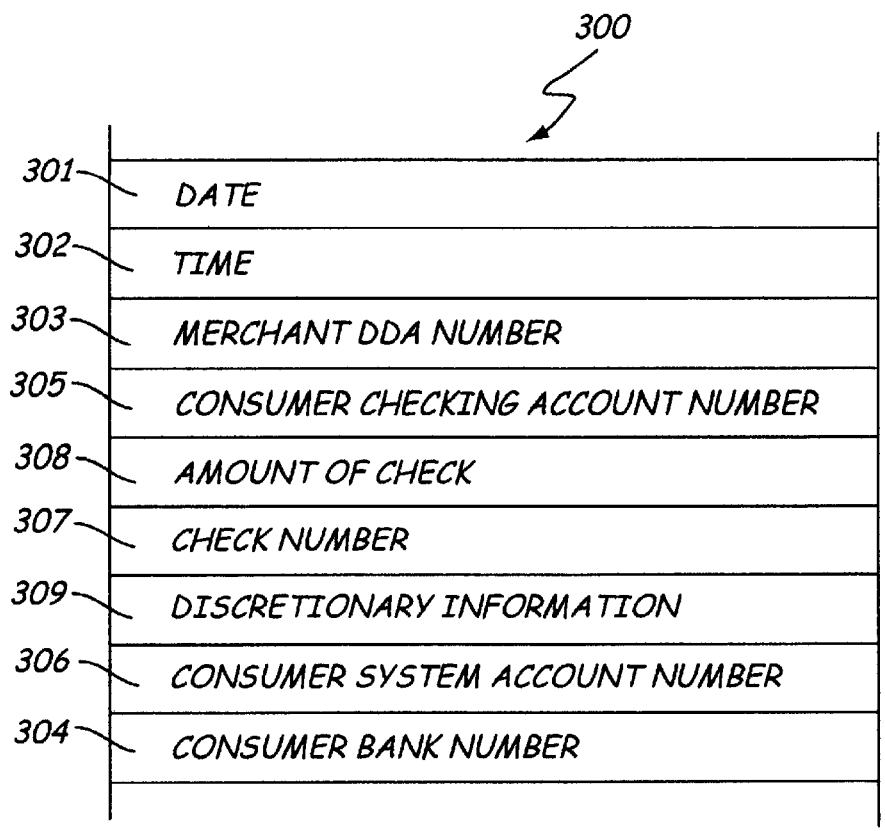
FIG. 4 shows the types of check transaction information that may be gathered at the point of sale.

FIG. 4 depicts a check transaction information record 300 that may be transmitted from the register 101 to the computer 115. The content of the check transaction information record 300 may be the same as the content of records in a corresponding database which may be stored on the computer 115 in the consumer databases 209. The check transaction information record 300 may contain the check transaction information gathered at the point of sale, such as the date 301 and time 302 of the transaction, the merchant bank routing number 303, the consumer bank routing number 304, the consumer checking account number 305, the consumer system account number 306, the check number 307, the amount 308 of the check, and other discretionary information 309. The discretionary information 309 could include a terminal and operator identification number that corresponds to the merchant, a code for whether the transaction will be a debit or a credit to the consumer account, and an authorization number. Each of the records described below may also include discretionary information that may vary depending on the specific information desired.

Figure 5:
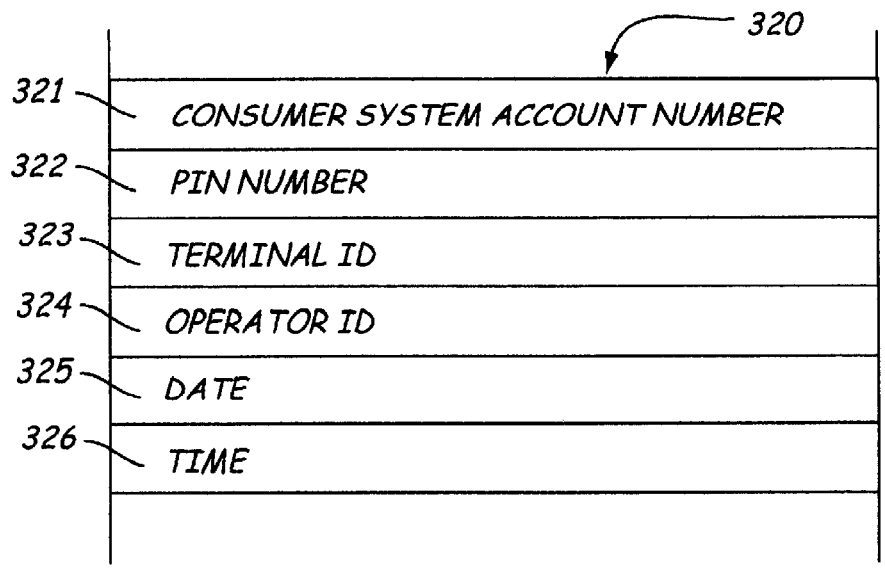
FIG. 5 shows the types of identification information that may be gathered at the point of sale.

FIG. 5 depicts an identification information record 320 that may be transmitted from the register 101 to the computer 115 along with the check transaction information record 300. The content of the identification information record 320 may be the same as the content of records in a corresponding database which may be stored on the computer 115. The identification information record 320 may contain the identification information gathered at the point of sale through the identification terminal 107. Such information may include the consumer system account number 321, the date 325 and time 326 of the transaction, the consumer's PIN number 322, and terminal and operator identification numbers that corresponds to the merchant. Although different reference numerals may be used, many of these entries in the identification information record 320 may correspond to similar entries in the check transaction information record 300.

Figure 6:
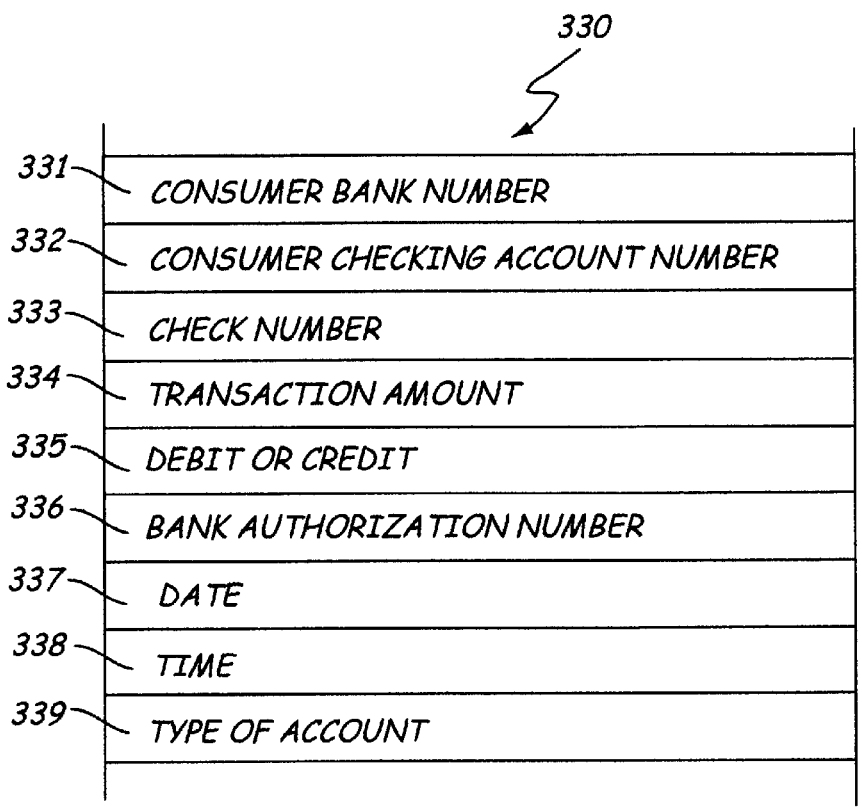
FIG. 6 shows the types of information that may be gathered from the consumer's bank.

The computer 115 may also be capable of communicating with various banks, such as a consumer's bank and a merchant's bank. FIG. 6 depicts a bank account information record 330 that contains bank account information that may be electronically requested and received from a consumer's bank through any communications devices and methods known to those skilled in the art. Throughout this specification, the term "account information" will be used to refer to any information received from the consumer's bank, such as the balance in the consumer's account. The information in the bank account information record 330 may include the consumer bank number 331, the consumer's checking account number 332, the last check number 333 for which the consumer's account has been updated, and the transaction amount 334. The transaction amount 334 refers to the balance in the consumer's account as determined by the consumer's bank, or to a list of transactions from which the computer 115 can determine the amount of money in the consumer's account. In one embodiment, for example, different transaction amounts 334 could refer to different transactions from the bank account, such as the amounts for which various checks are written. The bank account information record 330 could include a debit or credit code, which may refer to whether various transaction amounts 334 are debits from or credits to the consumer's account. A bank authorization number 336 may be contained in record 330 to verify the authenticity of the information received. Time 338 and date 337 information may also be included in the record 330. Additionally, the bank account information record 330 could include information on the type of account 339 held by the consumer, such as whether the consumer has overdraft protection for the account, daily cash card limits, or other pertinent information about the account.

Figure 7:
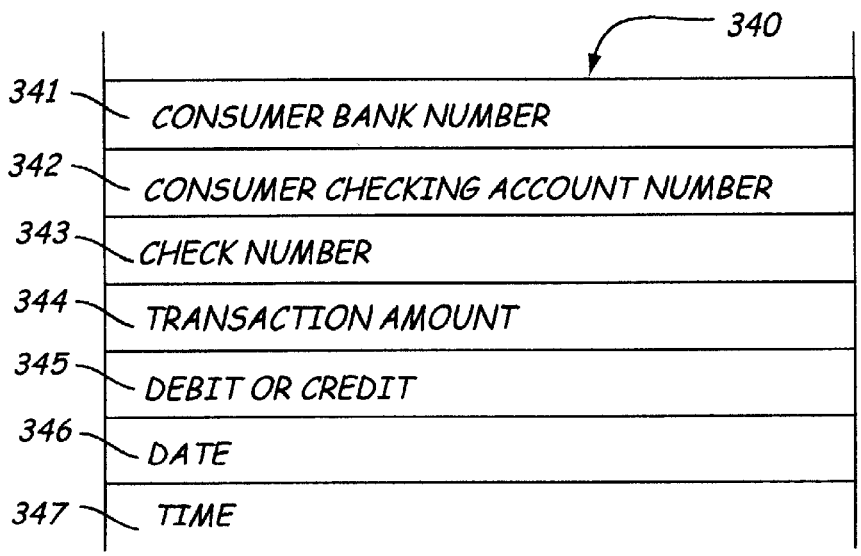
FIG. 7 shows the types of information that may be sent to the consumer's bank.

FIG. 7 depicts a bank update record 340 that may be electronically transmitted from the computer 115 to the consumer's bank through any communications devices and methods known to those skilled in the art. In one embodiment, the bank update record 340 may be used to update the consumer's bank account after a transaction at the point of sale. In another embodiment, the bank update record 340 may be transmitted to the consumer's bank when the computer 115 requests bank account information (the contents of which are described above and depicted in FIG. 6). The bank update record 340 may include the consumer bank number 341, the consumer's checking account number 342, the check number 343 for which the account may be updated, the transaction amount 344 for the check, whether the transaction is a debit or a credit 345 (a transaction at the point of sale will generally result in a debit from the consumer's account), and the date 346 and time 347.

When information is sent back to the point of sale from the computer 115 in the form of a funds availability status message, several different types of records may be provided. In one embodiment, the two record types available for such messages are a clear check record 350 and an insufficient funds record 360, which are discussed in more detail below.

FIG. 8 shows the information which may be contained in a clear check record 350 which may be transmitted from the computer 115 to the merchant at the point of sale. The clear check record 350 notifies the merchant that sufficient funds are present in the consumer's bank account to cover the check presented to the merchant at the point of sale. The clear check record 350 may be a simple record which includes the consumer system account number 351, the check number 352 which the consumer presented to the merchant, the date 353 and the time 354. A simple message such as "authorization received" or "check clear" or a code may also be contained in the record 350 to notify the merchant that the check is clear. The message could also include information on the type of the consumer's account 355, such as whether the consumer has overdraft protection or a large daily cash card limit. The type of account 355 information may also include a code representing the level of risk associated with the check proffered at the point of sale by the consumer.

FIG. 9 shows the information which may be contained in an insufficient funds record 360 transmitted from the computer 115 to the merchant when insufficient funds are present to cover a check or when a check is not clear for any other reason. In one embodiment, this record 360 may simply contain the customer system account number 361, the check number 364, the date 368 and time 369, as well as a message that insufficient funds are present. The insufficient funds record 360 may also include the consumer bank number 362, the consumer checking account number 363, the transaction amount 365, and the terminal 366 and operator identification numbers 367 for the given merchant. The insufficient funds record 360 may also include information on the type of account 370 held by the consumer, such as whether, the consumer has overdraft protection or a large daily cash card limit. Much like for the clear check record 350, the insufficient funds record 360 may contain information representing the level of risk associated with the check proffered at the point of sale by the consumer.

The insufficient funds record 360 may also include information for other results which may be considered negative by the merchant or consumer. For example, if there is a defect in the PIN number entered by the consumer or if the account number of the consumer is not found, the insufficient funds record 360 may contain this information. For this reason, the insufficient funds record 360 may be more broadly referred to as a "negative report record."

c. Operation of the Invention

Figure 10:
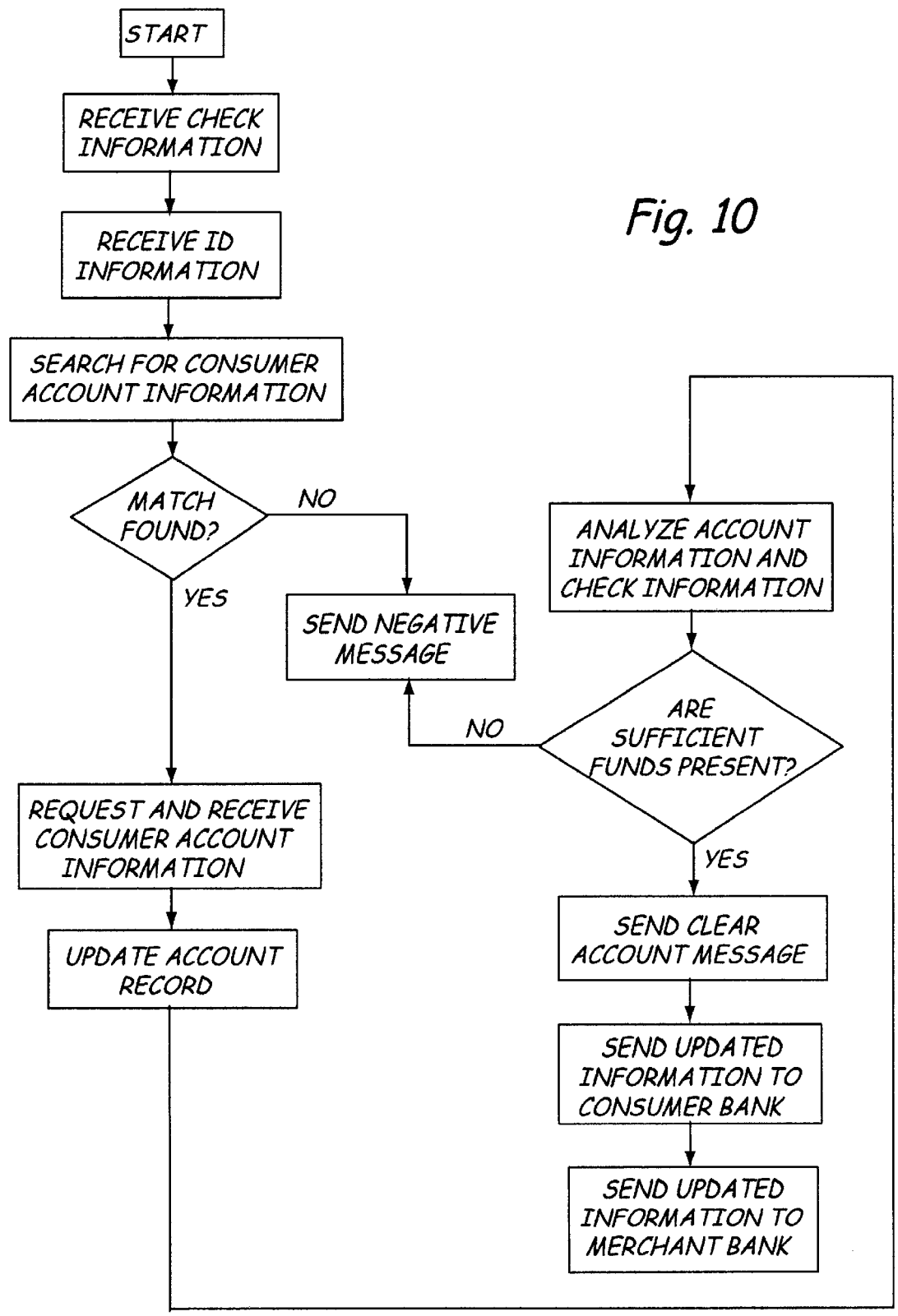
FIG. 10 is a flow chart representation of the data capture and data processing of the present invention.
Figure 11:
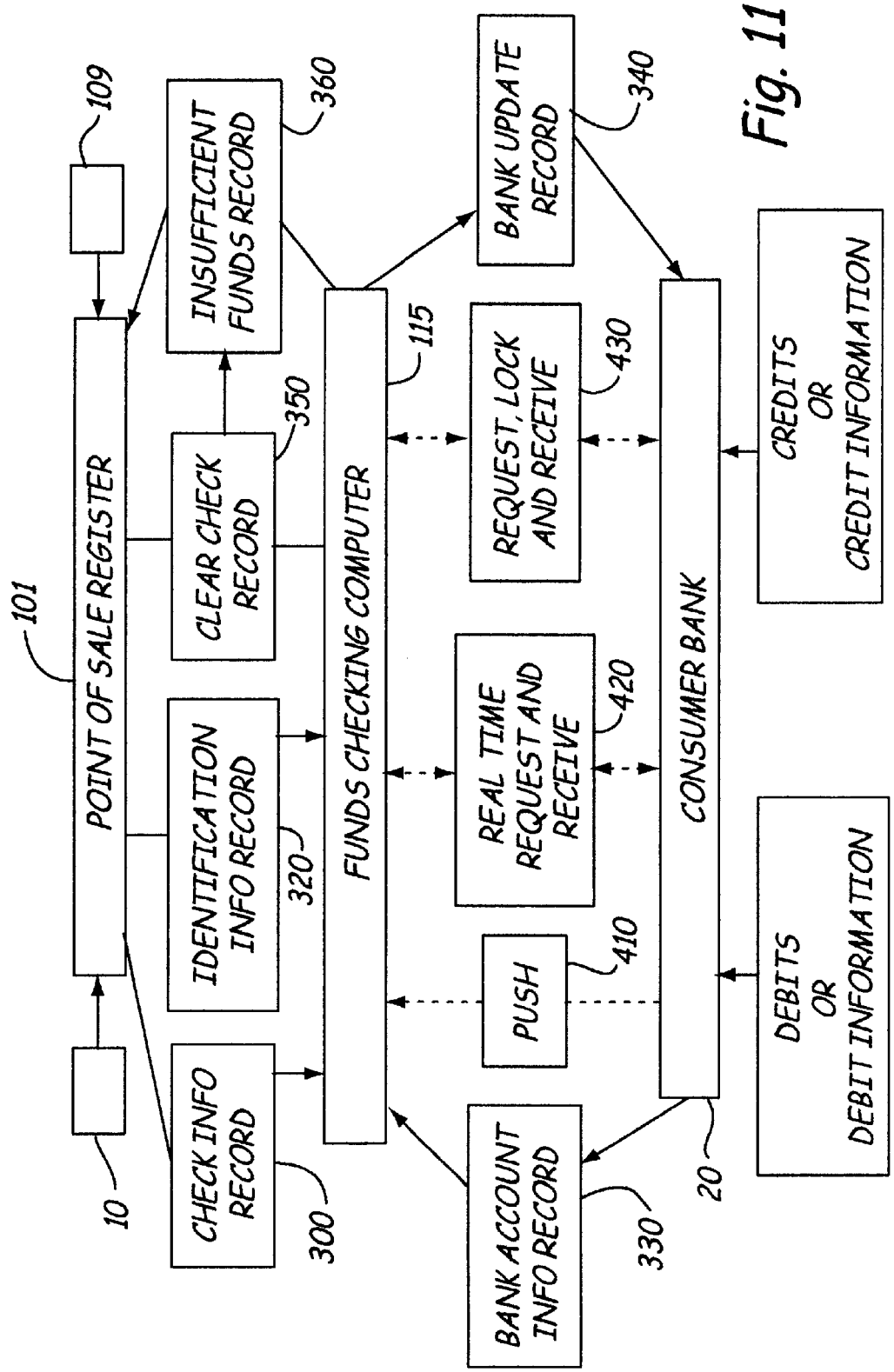
FIG. 11 depicts in block diagram form the flow of information and records in the present invention.

FIG. 10 is a flow chart of the data capture and data processing aspects of one embodiment of the present invention. FIG. 11 depicts in block diagram form the flow of information and records in the present invention. Prior to the acts depicted in FIG. 10, however, consumers may enroll in the program and receive an identification card 109 for use with the program. The consumer may choose or receive a PIN number along with the identification card 109 for use with the program. A consumer system account number may be assigned to each consumer enrolled in the program. The consumer may also enter into a contractual arrangement with the consumer's bank to cover the operation of the present invention so that information about the consumer's account may be used by the invention. In addition, merchants who desire to use the program may need to acquire the necessary equipment, such as a register 101, a bar reader 105, and an identification terminal 107 or to obtain software compatible with existing equipment that performs the functions described herein.

1. Capture of Information at the Point of Sale

Figure 1:
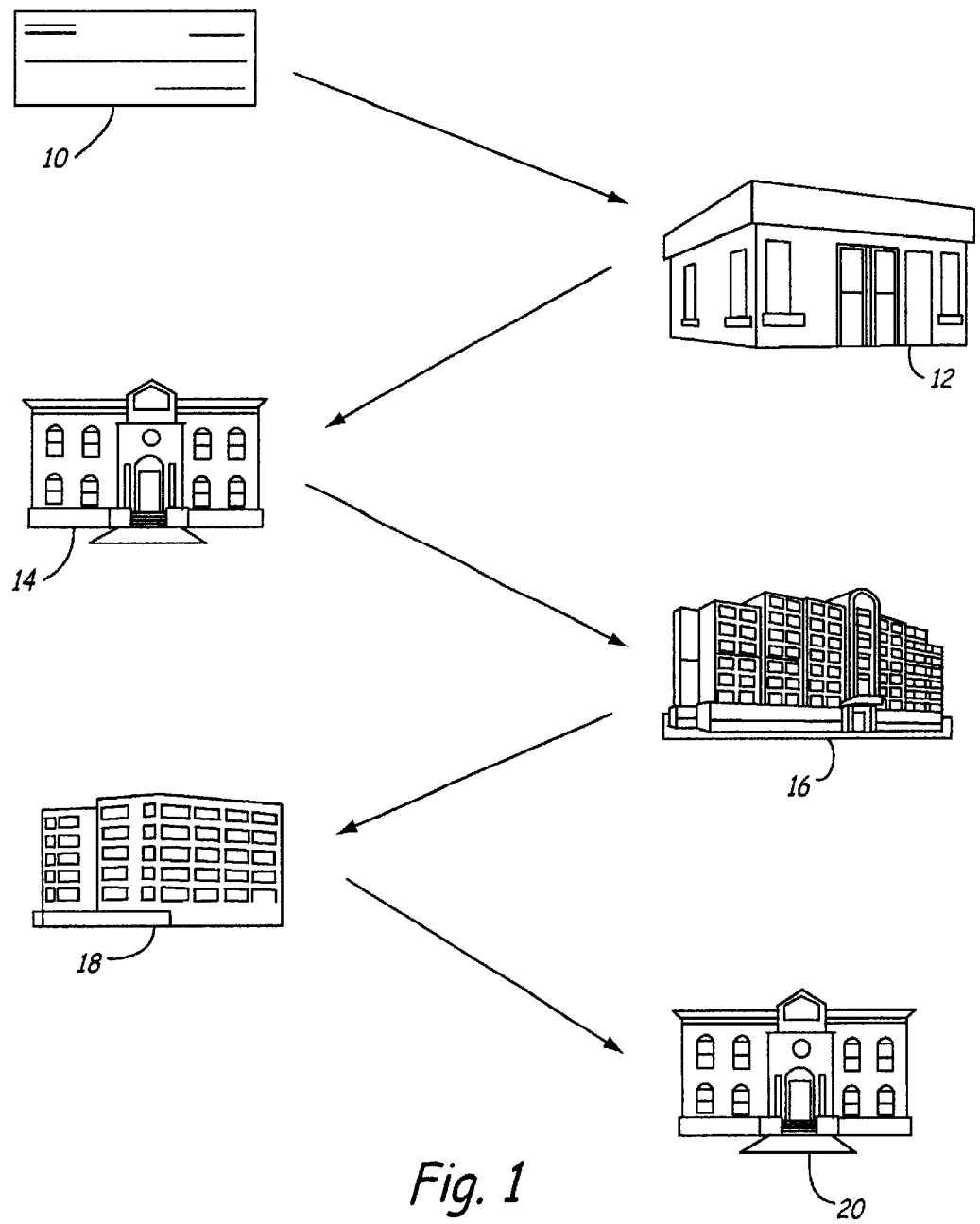
FIG. 1 is a flow diagram of typical prior art check processing for a check presented to a merchant.

When a consumer who is enrolled in the program of the present invention presents a check for payment for goods or services at the point of sale, the equipment of FIG. 1 is used to gather check transaction information for the given check. Because the methods and systems of the invention provide for the verification of funds to cover a check before a clerk decides whether to accept the check as payment, the check presented by the consumer at the point of sale will be referred to as a "proposed check payment" or "proffered check." The clerk may enter some information, such as the amount of the check, through a keypad of the register 101, and other check transaction information may be captured through the reader 105. A check transaction information record 300, which may contain all or some of the information depicted in FIG. 4, may be assembled for transmission to the computer 115, as depicted in FIG. 11.

An identification record 320, such as that depicted in FIG. 5, may also be assembled at the point of sale for transmission to the computer 115, as depicted in FIG. 11. The consumer may present an identification card 109 to be swiped through an identification terminal 107 to gather identification information about the consumer. The consumer's system account number 321, for example, may be encoded on the identification card 109 and may therefore be included in the identification record 320. The consumer may then enter an identification PIN number 322 at the point of sale through the keypad 111 of the identification terminal 107. The PIN number 322 may be verified against records of the consumer's system account number 321 and PIN number 322 at either the point of sale or at the remote computer 115. In one embodiment, the PIN number 322 could be encoded on the identification card 109 so that verification of a proper PIN number 322 entered by the consumer could be verified by the identification terminal 107 at the point of sale. In another embodiment, the consumer's PIN number 322 could be stored on the remote computer 115 and the verification of the PIN number 322 would take place on the remote computer 115. The terminal and operator identification numbers 324, 325 may be gathered from the identification terminal 107. After the check transaction information and identification information has been gathered, the check transaction information record 300 and the identification record 320 may be transmitted over the communications device 113 to the computer 115, as depicted in FIG. 11.

When the computer 115 has received and stored the check transaction information record 300 and the identification record 320, the computer 115 may use the processing programs 211 to search for the consumer's account information on the computer 115. If the consumer's account is not found, as shown in FIG. 10, a message (which may be referred to as a negative report record) may be sent the merchant at the point of sale so that the merchant can make a decision about whether to accept the check. Similarly, if the consumer enters the wrong identification number 322 for the identification card 109 at the point of sale, a message may be presented to the clerk to alert the clerk that the consumer may be a forger or, in any event, may not be the account's rightful owner. This provides security to the consumer, the merchant, and to the consumer's bank, which may ultimately be liable on a forged check. The search for the consumer's account may be conducted through use of the consumer's system account number 321 (also listed as numeral 306 in FIG. 4). If the consumer does have an account with the program, the system continues to attempt to determine whether sufficient funds are present in the consumer's account as described below.

2. Receipt of Account Information from Banks

The computer 115 gathers information about consumers' bank accounts periodically, as depicted in FIG. 10; FIG. 11 also shows a bank account information record being sent to the computer 115 from the consumer bank 20. A variety of different methods may be used to request and receive account information relevant to the check proffered at the point of sale by the consumer. The method by which account information is gathered and the timing of the information gathering may be important to the functions of the invention. Because one objective of the invention is to ensure, to the extent possible, that sufficient funds are present in the consumer's account to cover a check proffered at the point of sale, current information about the consumer's account balance may be important. It is desirable for the computer 115 to receive the current balance of the account so that the system does not wrongly identify sufficient funds as present for a given transaction. If bank account information containing the consumer's current balance is transmitted from the consumer bank 20 to the computer 115 and, before the consumer bank 20 is notified that the check from the point of sale is accepted for payment, an intervening debit from the consumer's bank account causes the balance which was presented to the computer 115 to be incorrect, the invention may not ensure that sufficient funds will be present to cover a check presented at the point of sale. Depending on how frequently the consumer bank 20 updates account information in its own records and how frequently the updates become available at the computer 115, such intervening debits could occur, e.g., if a holder of a debit card for the account withdraws money from the account or if another check written on the account is presented for payment to the consumer's bank 20.

As FIG. 11 shows, bank account information records 330 are transmitted from the consumer bank 20 to the computer 115. In one embodiment of gathering information from the consumer bank 20, a dedicated bank account is set up at the consumer bank 20 so that the only debits that may be made from the consumer's account are through the check verification methods and systems of the invention. In this embodiment, debits from cash cards or checks presented through other means are not permitted and will not debit funds from the consumer's account, which will not be set up to accept such debits. A daily update of bank account information records 330 together with bank update records 340 sent between the consumer bank 20 and the computer 115, as shown in FIG. 11, keeps the consumer's current balance in the computer 115. This daily information exchange could take place at the close of the business day, during the night, or at any other convenient time. Because all checks written on the consumer's account in this embodiment will be checked through the computer 115, the computer 115 will maintain the current balance of the consumer's account. In this embodiment, intervening debits from the consumer's account will not occur and hence the consumer's current balance will be accurate at the computer 115. A periodic update of information between all consumer banks 20 and the computer 115 will therefore keep current information in the computer 115 in this embodiment.

A variety of other methods may be used by the computer 115 to request and receive bank account information records 330 on the consumer's account. These alternative embodiments are suitable for accounts for which cash cards may be used and for which checks may be presented for payment through methods outside of the check verification program of computer 115, although these embodiments may also be used in conjunction with the dedicated account embodiment described above. Three of these alternative embodiments are shown in FIG. 11 with phantom lines depicted between the consumer bank 20 and the computer 115 to show that any of these embodiments, as well as other embodiments, may be used within the scope of the invention.

In one alternative embodiment, a push 410 method may be used to receive information from the consumer bank 20. In this embodiment, bank account information records 330 may be gathered from a consumer's bank periodically, such as once per day or twice per day. The information may be automatically transmitted from the consumer bank 20 to the computer 115 at set periods of time, with or without requests from the computer 115 for the information. In another push 410 embodiment, bank account information records 330 could be automatically transmitted to the computer 115 from the consumer's bank essentially immediately whenever a credit or debit is posted to a consumer's account. Although these two embodiments may be used for the invention with reasonable security, they may not guarantee that intervening debits will not occur to cause the check presented at the point of sale to bounce.

Other embodiments of the present invention may ensure, or at least provide increased certainty, that a check presented at the point of sale will not bounce. In the embodiment of FIG. 10 and in the real time request and receive 420 embodiment of FIG. 11, the computer 115 requests an update from the consumer's bank 20 upon receiving a check transaction information record 300 from the point of sale. In other words, in this embodiment the computer 115 may request account information for a given consumer shortly after the consumer proffers a check at the point of sale. In this embodiment, the bank account information record 330 received from the consumer bank 20 will consist of recent information so that the risk of an intervening debits from the consumer's account will be decreased.

In another embodiment, referred to as the request, lock, and receive 430 embodiment in FIG. 11, the computer 115 may transmit to the consumer's bank 20 the amount of the check presented by the consumer at the point of sale and the number of the check (or any of the information depicted in FIG. 7 for a bank update record 340) when requesting bank account information from the bank. The consumer's bank 20 may then send a bank account information record 330 back to the computer 115, and the consumer's bank may also provisionally debit the consumer's account, allocating funds to pay the proffered check, so that any intervening debits will not occur that would cause the check presented at the point of sale to bounce. Because there is a provisional debit on the consumer's account, the check proffered at the point of sale will be considered debited from the consumer's account and intervening debits will not cause the proffered check to bounce.

In another embodiment of the request, lock, and receive 430 embodiment that may ensure a proper account balance to cover a check presented at the point of sale, the computer 115 requests an update from the consumer's bank and electronically sends a check number (as well as any other data depicted in FIG. 7 for a bank update record 340) to the consumer's bank 20. The consumer's bank 20 may then send a bank account information record 330 back to the computer 115, and the consumer's bank 20 may hold the consumer's account so that no other debits are made until information on the check proffered by the consumer at the point of sale is received. When a bank update record 340 is eventually sent to the consumer's bank 20 to confirm that the proffered check was accepted by the merchant at the point of sale, the consumer's bank 20 could update its records accordingly and remove the hold on the consumer's account.

3. Determination of Availability of Funds and Notification to the Point of Sale

After current consumer bank account information has been received, the computer 115 may use the processing programs 211 to analyze the information to determine if sufficient funds are present in the consumer's account to cover the proffered check. If sufficient funds are not present to cover the transaction, a message may be sent from the computer 115 to the merchant at the point of sale to alert the merchant and consumer that insufficient funds are present in the consumer's account. In one embodiment, and as depicted in FIG. 11, this message may contain the information depicted in the insufficient funds record 360 of FIG. 9 and as described above. Because the merchant and the consumer will be notified that the consumer's account does not contain sufficient funds, the consumer may avoid the cost of an overdraft fine, and the merchant may avoid the possibility of being liable for a bad check. Of course, the clerk may still accept the check if the clerk believes that the consumer's bank 20 will cover the check and if the consumer is not concerned about any possible overdraft penalties.

If sufficient funds are present in the consumer's account to cover the amount of the check, a clear check record 350, such as that depicted in FIG. 8 and described above, may be transmitted from the computer 115 to the merchant at the point of sale as shown in FIG. 11. Although the clerk may decide not to accept the check as payment for some reason (e.g., suspicious identification), the clerk will be notified that sufficient funds are currently present in the consumer's account to cover the transaction. Typically, the clerk will accept the check as payment at the point of sale. If sufficient funds are present in the consumer's account, therefore, the processing programs 211 of the computer 115 may consider the check as a debit to the consumer's account. Information on the type of account 355 held by the consumer, as shown in FIG. 8, may also be sent to the merchant at the point of sale.

In cases where the clerk accepts a check proffered by the consumer as payment for a purchase transaction, a bank update record 340, such as that depicted in FIG. 7 and described above, may be electronically transmitted from the computer 115 to the consumer's bank as shown in FIG. 11. The bank update records 340 provide the consumer's bank 20 with the information about the check the consumer presented to the merchant at the point of sale so that the bank can provisionally update the consumer's account balance with the information from the check. An update record may also be sent to the merchant's bank so that a provisional credit may be made to the merchant's account if desired by the merchant's bank.

Different levels of funds availability risk may be associated with different bank accounts and with the various methods of requesting and receiving bank account information from the consumer's bank 20. This has two implications. First, the processing at the funds checking computer 115 may involve not only a comparison of the proffered check amount and the available balance, but an analysis of the type of account and timing of updating information that may affect the reliability of the available account balance information and the risk of accepting the check. For example, the analysis might include account balance, number of outstanding cash withdrawal cards and any daily cash withdrawal limit. Second, the merchant may want to know the result of the risk assessment analysis or the components of risk.

For these reasons, in one embodiment of the invention, the clear check record 350 or the insufficient funds record 360 (which may be referred to as funds availability status messages) sent to the register 101 at the point of sale may contain information on the type of account (as shown in FIGS. 8 and 9) held by the consumer so that the merchant can assess the risk level at the point of sale. In another embodiment, the clear check record 350 or insufficient funds record 360 could contain information on the level of certainty that adequate funds are available in the consumer's account. For example, if the request, lock, and receive 430 method of gathering information from the consumer bank 20 is used, a high level of certainty (approaching 100%) may be available as to whether adequate funds are available in the consumer's account. If the real time request and receive 420 embodiment is used, a somewhat decreased level of certainty may be presented. Similarly, a lower level of certainty will be associated with the push 410 embodiment of FIG. 11. In one embodiment of the invention, therefore, the computer 115 may process the information received from the consumer bank 20 and report a level of risk as to whether the funds will be available. If other information is presented to the point of sale, such as the fact that insufficient funds are available in the consumer's account, but overdraft protection is available, the consumer can make a decision as to whether to use the check as payment. Similarly, information on the daily limit of debit cash card withdrawals may be presented to the point of sale so that the merchant or consumer can make a determination as to the likelihood that intervening cash withdrawals may cause the proffered check to bounce.

It should further be recognized that by accumulating a large volume of transaction information with associated risk analysis, and by correlating this information with bank information or any incidents of actual insufficient funds checks, the operators of computer 115 can get a clearer picture of actual risk experience for merchants. This information can be used over time to refine the risk level information provided to merchants in a funds availability status message. The result may be a set of risk level codes that can be quickly interpreted at the point of sale.

d. Summary

The present invention provides methods and systems for checking a check at a point of sale to ensure that sufficient funds are present in the consumer's account to cover the transaction. Transaction equipment, such as bar readers and keypads, may be used to gather check transaction information and, optionally, identification information, at the point of sale. This information may then be transmitted to a remote computer 115, where it may be stored in databases 209 and where processing programs 211 may manipulate the data. The computer 115 may also request and receive bank account information from the consumer's bank 20. The processing programs 211 may then analyze the check transaction information and bank account information to determine if adequate funds are present in the consumer's account to cover the transaction. If sufficient funds are present, a corresponding message may be sent to the merchant at the point of sale. Likewise, if insufficient funds are present, or if the consumer does not have a valid and open account, a message may be sent from the computer 115 to the merchant so that the merchant has the option of refusing to accept the check as payment.

The present invention provides numerous advantages. It benefits consumers because if the methods and systems are widely used, consumers will not bounce checks frequently, and will hence avoid bounced check penalties and penalties for accidental overdrafts. In addition, banks may be more willing to open bank accounts for low income consumers who may, without the use of the present invention, bounce checks or have insufficient funds frequently. In addition, the identification aspects of the invention may provide some protection to the consumer from lost or stolen checks. The invention benefits banks because it decreases the chance that a consumer's or a merchant's bank will be liable for bad checks, such as checks with forged endorsements. Finally, the invention may protect merchants from fraudulent checks, stolen checks, and checks for which the corresponding account does not have sufficient funds.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of elements in the following claims is merely for convenience and is not intended to suggest that the ordering of the elements of the claims has any particular significance other than that otherwise expressed by the language of the claims.

What is claimed is:

1. A check verification method for providing information concerning the availability of funds to cover a check proffered at a point of sale, said check being drawn on a checking account held at a payor institution and, if accepted, being processed by ACH or other clearing methods to cause payment from the payor institution and debiting of the account balance of the checking account maintained at the payor institution, the method comprising:

enrolling one or more checking accounts held at at least one payor institution in a funds checking computer system that maintains a database for enrolled accounts containing checking account status information, including an account type, for the one or more enrolled checking accounts and further containing funds checking computer system current balance information maintained by the funds checking computer system;

identifying in the funds checking computer system at least one of the enrolled checking accounts as a dedicated type account requiring that a proffered check can be presented for processing by ACH or other clearing methods and payment from the account at the payer institution only after a risk determination at the funds checking computer system;

receiving periodically at the funds checking computer system in electronic record form account information provided by at least one payor institution holding at least one of the enrolled checking accounts, such account information including a payor institution account balance or credit and debit transaction amounts affecting the payor institution account balance;

receiving at the funds checking computer system check transaction information in electronic record form from proffered checks drawn on the one or more enrolled checking accounts, said check transaction information being captured at one or more points of sale before such checks are processed by ACH or other clearing methods;

responsive to the check transaction information for each proffered check, determining at the funds checking computer system whether the checking account on which the proffered check is drawn is an enrolled checking account and, if so, responsive to the check transaction information captured at the point of sale for such proffered check, the funds checking computer system current balance information, and whether the account type of the account on which the proffered check is drawn is dedicated or not dedicated, determining the risk associated with the availability of funds in the enrolled checking account to cover such check proffered at the point of sale; and providing to the point of sale where the check was proffered a funds availability status message for the check proffered, responsive to the risk determined.

2. The method of claim 1 further comprising adjusting the funds checking computer system current balance information with a debit when a proffered check is accepted.

3. The method of claim 1 wherein the act of receiving at the funds checking computer system account information comprises receiving account information transmitted in real time by the institution holding the account responsive to a change in the payor institution account balance.

4. The method of claim 1 wherein the act of receiving at the funds checking computer system account information comprises receiving account information from the institution holding the enrolled checking account after the institution completes daily check debiting and account balancing.

5. The method of claim 1 wherein the funds availability status message for a proffered check includes information on a type of account information updating received by the funds checking computer system for the enrolled checking account on which such check is drawn.

6. The method of claim 1 wherein the act of determining the risk associated with the availability of funds includes analyzing information on whether the account type of the enrolled checking account on which the check is drawn has overdraft protection or daily cash card limits.

7. The method of claim 1 wherein the funds availability status message includes information on the account type of the enrolled checking account on which the check is drawn.

8. The method of claim 1 wherein the funds availability status message provides information on a funds availability risk level based on the account type of the enrolled checking account on which the check is drawn.

9. The method of claim 1 wherein the funds availability status message provides information on a daily limit of funds which may be withdrawn from the enrolled checking account by transactions not verified by the funds checking computer system.

10. The method of claim 1 wherein the account type of at least one of the enrolled checking accounts is identified as a dedicated account that requires that the only account owner-initiated debiting of the account balance of the checking account maintained at the payor institution occurs by reason of transactions verified by the funds checking computer system and subsequent check acceptance and clearing or by reason of a debit card cash withdrawal within a limit associated with the checking account.

11. The method of claim 1 further comprising the funds checking computer system sending an update record for a proffered check to the corresponding payor institution and such payor institution provisionally debiting the account balance of the checking account corresponding to the proffered check maintained at such payor institution.

12. The method of claim 1 further comprising capturing at the point of sale identification information, including a PIN, on a person who purportedly holds signatory authority for the enrolled checking account on which a proffered check is drawn and transmitting the identification information to the funds checking computer system, validating at the funds checking computer system the identification information, including the PIN, and providing to the point of sale an identification message which specifies whether the identification information is valid.

* * * * *